Dec. 24, 1963 L. J. MATTINGLY 3,115,606

GAIN CONTROL OF LIMITER STAGE OF A QUADRATURE GRID DETECTOR

Filed Nov. 6, 1956

INVENTOR.
Lawrence J. Mattingly
BY
Mueller and Aichele
Attys.

United States Patent Office 3,115,606
Patented Dec. 24, 1963

3,115,606
GAIN CONTROL OF LIMITER STAGE OF A QUADRATURE GRID DETECTOR

Lawrence J. Mattingly, Lombard, Ill., assignor to Motorola, Inc., Chicago, Ill., a corporation of Illinois Filed Nov. 6, 1956, Ser. No. 620,674
10 Claims. (Cl. 325—487)

Figures 1, 2:
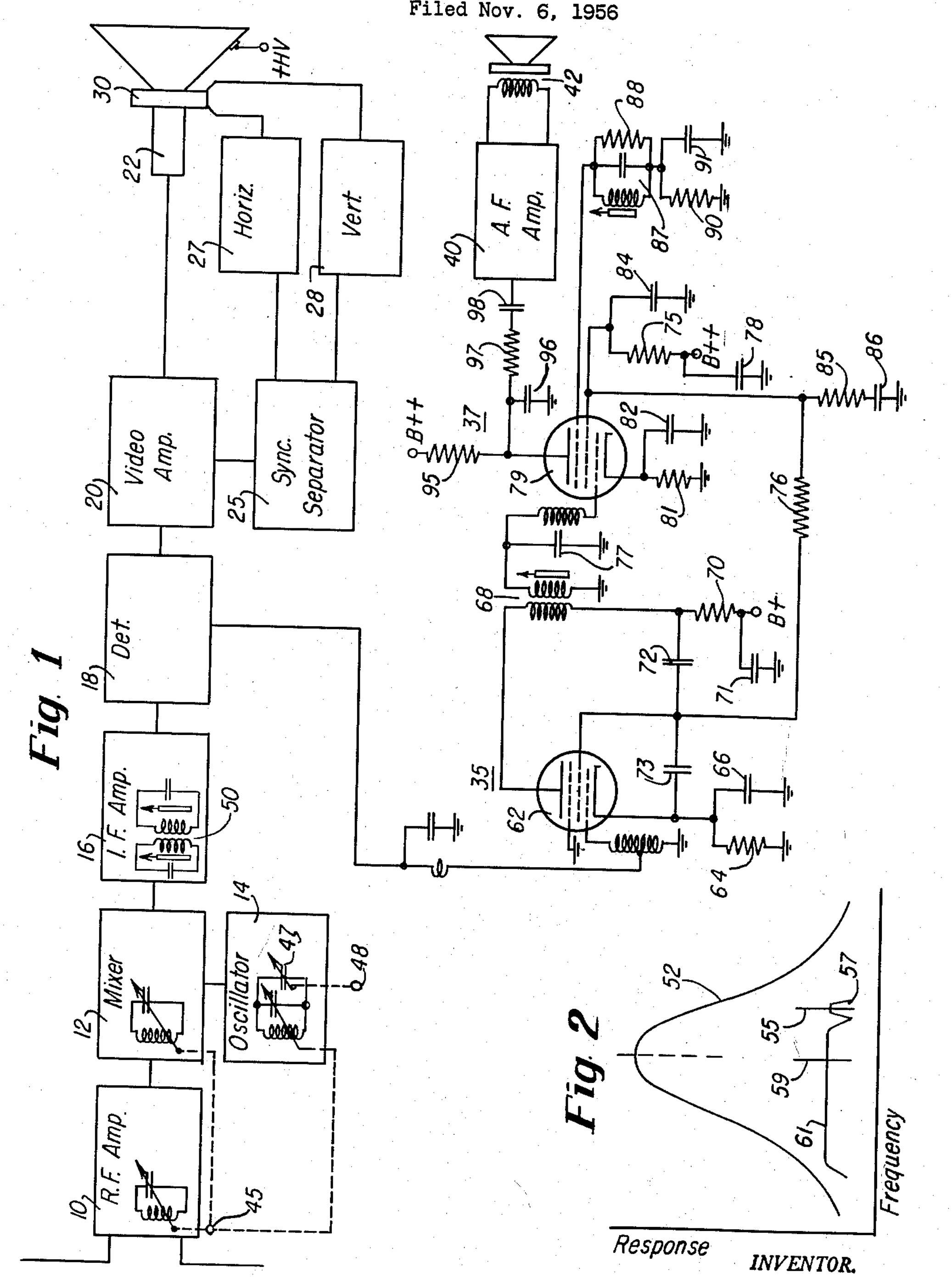

This invention relates to demodulator circuits and more particularly to a detector for frequency modulation signals such as the sound carrier of a composite television signal. Reference to frequency modulation in the specification and claims is intended to refer broadly to all angular modulation including phase modulation.

One form of frequency modulation detector employs a single electron valve with a control element driven by the signal to be detected and a further control element connected to a resonant circuit tuned to the signal. This resonant circuit is energized by the signal applied through coupling within the tube and a wave developed therein regulates conduction of the tube in the region near quadrature or zero passage of the signal. As the modulated signal deviates, the phase angle at which the further control element is driven changes with respect to the drive signal and the modulation of the signal is available at the output element of the valve.

A circuit of this type can be used as a simple detector for the sound signal in a television receiver. However, in such service there may be a great variation in signal level applied to the detector and this can cause undesirable operation. For example, in fine tuning a television receiver so that the video carrier of the composite television signal is near the maximum response of the intermediate frequency response curve, the sound carrier could be of the order of 60 db below the carrier level. In this situation the comparatively weak sound carrier may not be of sufficient strength to properly operate the detector, that is, it may not hold the detector "locked in" to follow deviations thereof thus producing distortion. On the other hand, if the sound carrier is positioned near the maximum response of the intermediate frequency curve, this signal can be greater than the video carrier by an amount of the same order. This condition can cause overdrive of the detector and adversely affect the amplitude modulation rejection of the detector.

It is accordingly an object of this invention to provide a detector system for frequency modulation signals which operates in an improved manner over a wide range of signal levels.

Another object is to provide a detector system for frequency modulation signals which has increased sensitivity for weak signals and decreased sensitivity for strong signals.

A further object is to provide a frequency modulation detector wherein distortion of weak signals is reduced and amplitude modulation rejection at high signal levels is greatly enhanced.

A feature of the invention is the provision of a simple frequency modulation detector system which automatically reduces or increases the drive signal applied to the detector when that signal tends to rise or fall in level, thus improving detector operation over a wide range of signal levels.

Another feature of the invention is the provision of a quadrature grid frequency modulation detector wherein the potential at the screen grid of the detector tube increases or decreases the potential at the screen grid of a limiter tube driving the detector for maximizing sensitivity of the detector system to weak signals and reducing the sensitively thereof to strong signals.

Further objects, features and the attending advantages of the invention will be apparent upon consideration of the following description when taken in conjunction with the accompanying drawing in which:

FIG. 1 is a diagram of a television receiver incorporating the detector system of the invention; and FIG. 2 is a graph representing the intermediate frequency response of the receiver to the video and sound carriers of a television signal.

In practicing the invention there is provided a detector system for frequency modulation signals including a limiter stage with an electron valve having several control elements, or grids, which stage drives a quadrature grid detector. The detector includes an electron valve with a control element, or grid, driven by the signal to be detected and a further control element, or grid, energized by a tuned circuit which develops a control signal near phase quadrature to the applied signal so that detection occurs as conduction of the tube is regulated by the phase difference at these two control elements. The detector valve further includes a control element or screen grid coupled through resistor means to a potential source so that the voltage level at this grid varies inversely with the strength of the signal to be detected. This screen grid is also coupled to a grid, preferably the screen grid, of the limiter tube so that gain of this stage is regulated in inverse relation to the signal level applied to the detector stage whereby weak signals are applied to the detector at an increased level and strong signals are coupled thereto at a decreased level thereby minimizing distortion in the detector and improving AM rejection.

FIG. 1 shows a television receiver including a radio frequency amplifier 10 which selects and amplifies signals which are then applied to the mixer stage 12. Local oscillator 14 is also coupled to mixer stage 12 so that a received signal is thus heterodyned and applied to intermediate frequency amplifier 16 wherein it is selected and further amplified after which it is coupled to a detector stage 18. The video carrier of the composite television signal is coupled to video amplifier 20 and then to the cathode ray picture tube 22 which reproduces this signal as an image on its screen. A synchronizing signal separator 25 is also coupled to the video amplifier and this derives portions of the video signal which synchronize the horizontal sweep system 27 and the vertical sweep system 28 which are coupled to deflection yoke 30 to provide scanning of the electron beam in the picture tube 22.

Detector 18 is also connected to a sound amplifier or driver 35 which provides amplification and limiting of the frequency modulation sound carrier of the composite video signal, generally at 4.5 megacycles. Amplifier 35 is connected to the quadrature grid detector 37 which demodulates the frequency modulation carrier and applies the resulting audio to the audio frequency amplifier 40. This audio signal is then coupled to loudspeaker 42.

Amplifier 10 and mixer stage 12 are tuned to the desired signal by means known in the art. Oscillator 14 is tuned to a frequency which is displaced from the desired signal by the intermediate frequency. The control for this purpose is represented diagrammatically herein as ganged control 45. The oscillator 14 further includes a fine tuner 47 which is operated by a control 48 in order to vary slightly the frequency of the signal produced thereby for optimum reception. The intermediate frequency amplifier 16 includes various tuned circuits designated generally as tuned transformer 50 which may have a frequency response characteristic designated by curve 52 of FIG. 2. It should be apparent that as control 48 is varied the sound carrier 55 having a band width 57 may be positioned at the peak or at some sloped portion of the curve 52. Similarly, video carrier 59 having a band width 61 may also be positioned on the peak or some sloped portion of curve 52. In the present day television signal video carrier 59 is separated by 4.5 megacycles from sound carrier 55. In the situation illustrated in FIG. 2, with video carrier 59 positioned on the peak of response curve 52, as much as 60 db can separate this carrier from sound carrier 55. By retuning fine tuner 47 it is possible that the reverse situation can exist with the level of the sound carrier exceeding the level of the video carrier by an amount of the order of 50 db.

Accordingly, over such wide signal input variations the level of the driving signal applied to detector 37 would ordinarily be undesirably low in which case difficulty may be experienced in causing the detector to "lock in" with the driving signal and this is particularly troublesome near maximum deviation of the applied signal. Furthermore, at very high input signal levels, overdrive of detector 37 can easily occur in which case the detector may have very poor AM rejection characteristics.

Referring to the frequency modulation detector system specifically, it may be seen that the 4.5 megacycle sound carrier is applied from detector 18 to the control grid of driver electron valve 62. Cathode bias for this tube is provided by resistor 64 which is bypassed for signal frequencies by capacitor 66. The suppressor grid of this tube is grounded and the anode thereof is coupled through the primary winding of transformer 68 and decoupling resistor 70 to B+. Capacitor 71 grounds B+ for signals. The decoupling system is completed by a capacitor 72 connected from resistor 70 to the screen grid of tube 62, which screen grid is connected to the cathode through a bypass capacitor 73. A positive potential for the screen grid of valve 62 is applied thereto from B++ through resistor 75 and resistor 76 which are series connected B++ is bypassed for signals by capacitor 78. Driver 35 is operated to provide some limiting of the frequency modulation signal and amplification thereof to operate detector 37.

The secondary of transformer 68 is tuned by capacitor 77 and coupled to the control grid of electron valve 79. The other side of the secondary winding and capacitor 77 are connected to ground. Cathode bias for valve 79 is provided by resistor 81 which is bypassed for signals by capacitor 82. In a particular construction of the detector it may be advisable to construct this cathode circuit to be somewhat degenerative at the audio frequencies involved to provide improved operation of the detector. The screen grid of valve 79 is connected to B++ through resistor 75, which is a resistor common to the screen grid energizing circuits of both driver and detector, and bypassed to ground through capacitor 84. A further bypass for audio frequencies is provided by capacitor 86. Resistor 85, series connected with capacitor 86 reduces possible resonant effects due to the presence of any inductive reactance in capacitor 86, which may be of the electrolytic type.

The suppressor grid of valve 79 is connected to one side of a parallel tuned circuit 87 which is shunted by a damping resistor 88. The other side of tuned circuit 87 is connected to ground through a parallel combination of bias resistor 90 and signal bypass capacitor 91. Tuned circuit 87 is resonant at the frequency of the carrier of the sound intercarrier signal and is energized by this signal through coupling within the valve including the electrode capacity between the control grid and suppressor grid. In this circuit therefore, the suppressor grid will be driven in phase quadrature to the frequency modulation signal applied between the control grid and cathode. It is contemplated that at low signal level the circuit will operate as a locked oscillator detector due to the feedback through capacitance between the suppressor and control grids so that demodulated output appears at the anode of electron valve 79. At higher signal levels the input signal exceeds the self-oscillation level of the detector and the phase changes of the signal on the supressor grid with respect to the driving signal at the control grid, due to the tuned circuit 87, provide regulation of conduction of the valve so that detected output appears at the anode. A load resistor 95 is coupled from the anode of valve 79 to B++ and the anode is bypassed to ground for radio frequencies by capacitor 96. The demodulated output is then taken from the anode through a coupling network comprising series connected resistor 97 and blocking capacitor 98 which are connected to the audio frequency amplifier 40.

In the system of the present invention to overcome the previously mentioned defects caused by wide variations in signal input level, the screen grid of driver electron valve 62 is coupled to the screen grid of detector electron valve 79 and the two grids are coupled to an energizing source through a common dropping resistor 75. Thus as the signal level at the detector valve 79 increases, the screen grid current increases thereby increasing the voltage drop across resistor 75 and lowering the voltage at the screen grid of valve 62 which reduces the amplification in this stage and reduces the drive of the detector stage. Conversely as the signal at the detector decreases, the screen grid current of valve 79 decreases producing a reduced voltage drop across resistor 75 thus raising the potential at the screen grid of the valve 62 and increasing the amplification of this valve to increase the level of the signal applied to the detector. By proper selection of component values it is possible to greatly improve the detector operation.

In a constructed embodiment of the invention the part following circuit parameters were utilized and provided the operation as described:

| | | |
|---|---|---|
| Valve 62 | | 3AU6 |
| Resistor 64 | ohms | 150 |
| Capacitor 66 | microfarad | .005 |
| Resistor 70 | ohms | 1000 |
| Capacitor 72 | microfarad | .005 |
| Capacitor 73 | do | .005 |
| Resistor 75 | ohms | 22,000 |
| Resistor 76 | do | 10,000 |

Capacitor 77 and the secondary winding of transformer 68 are tuned to the signal.

| | | |
|---|---|---|
| Valve 79 | | 3DT6 |
| Resistor 81 | ohms | 560 |
| Capacitor 82 | microfarad | .01 |
| Capacitor 84 | do | .005 |
| Resistor 85 | ohms | 220 |
| Capacitor 86 | microfarads | 5 |

Tuned circuit 87 is tuned to the frequency of the signal.

| | | |
|---|---|---|
| Resistor 88 | ohms | 82,000 |
| Resistor 90 | do | 560,000 |
| Capacitor 91 | microfarad | .01 |
| Resistor 95 | ohms | 27,000 |
| Capacitor 96 | micromicrofarads | 220 |
| Resistor 97 | ohms | 4700 |
| Capacitor 98 | microfarad | .01 |
| B+ | volts | 150 |
| B++ | do | 250 |

Accordingly it may be seen that the detector system of the present invention will automatically adjust itself for maximum drive under weak signal conditions in order to improve the lock-in characteristics of the detector at such times and reduce the tendency for distortion at wide deviation of the applied signals. Furthermore, the system will automatically adjust itself to prevent overdriving the detector stage under strong signal conditions in order to provide improved detector operation under this condition. It should also be apparent that these objectives can be achieved in a simple manner and at low cost with the present invention.

I claim:

1. A system for detecting frequency modulation signals including in combination a limiter stage having a first electron valve with a plurality of electrodes including a space current drawing electrode the potential of which regulates the gain of said limiter stage, means to apply frequency modulation signals to said limiter stage, a detector stage including a second electron valve having a plurality of grids including a screen grid, said detector stage also including circuit means forming with said second electron valve a quadrature frequency modulation demodulator, circuit means connecting said limiter stage to said detector stage for applying signals to said detector stage, direct current conducting means including a resistor coupling said screen grid of said detector stage to a potential source so that the potential at said detector screen grid varies with the level of said signals, and further direct current conducting means coupling said current drawing electrode of said limiter stage to said screen grid of said detector stage so that the gain of said limiter stage is regulated according to the level of signals being detected.

2. In a television receiver which translates a frequency modulated sound signal of substantially fixed frequency and variable strength, the system for detecting said signal including in combination a driver stage having a first electron valve with a plurality of grids including a screen grid the potential of which regulates the gain of said driver stage, means for applying said sound signal to said driver stage, a detector stage including a second electron valve having a plurality of electrodes including an output electrode, said detector stage also including circuit means providing quadrature grid frequency modulation detection in said second electron valve, circuit means coupling said driver stage to said detector stage for applying said sound signal thereto, resistor means coupling said output electrode of said second electron valve to a positive potential source, the value of said resistor means being selected so that changes in signal level at said detector stage are reflected as a change in potential at a point of said resistor means, and direct current conducting means coupling said screen grid of said first electron valve to said point of said resistor means so that the gain of said driver stage is regulated according to the strength of signals being detected.

3. In a television receiver which translates a frequency modulated sound signal of substantially fixed frequency and variable strength, the system for detecting said signal including in combination a limiter stage having a first electron valve with a plurality of electrodes including a space current drawing electrode the potential of which regulates the amplification of said limiter stage, means for applying said sound signal to said limiter stage, a detector stage including a second electron valve having a plurality of grids including a screen grid, said detector stage having circuit means including a tuned circuit coupled to a grid of said second electron valve providing quadrature grid frequency modulation detection in said electron valve, circuit means coupling said limiter stage to said detector stage for applying said sound signal thereto, first resistor means coupling said screen grid of said second electron valve to a positive potential source, the value of said first resistor means being selected so that changes in signal level at said detector stage are reflected as a change in potential at a point of said first resistor means, and second resistor means coupling said space current drawing electrode of said first electron valve to said point of said first resistor means so that the gain of said limiter stage is regulated according to the strength of signals being detected.

4. A system for detecting frequency modulation signals including in combination a driver stage including a first electron valve having first and second control elements and a first output element, means to apply frequency modulation signals to said first control element so that said signals appear at said first output element, said second control element being adapted to regulate the gain of said driver stage according to the potential thereof, a detector stage including a second electron valve having third, fourth and fifth control electrodes and a second output electrode, circuit means coupling said third control element to said first output element, a tuned circuit coupled to said fourth control element and energized by said signals so that phase changes of said signal in said tuned circuit cause detected signals to appear at said second output element, resistor means for coupling said fifth control electrode to a potential source so that the potential of said fifth control element is dependent upon the level of said signals, and direct current conducting means including signal decoupling means coupling said second control electrode of said first electron valve to said fourth control electrode of said second electron valve so that the gain of said driver stage is regulated according to the level of signals to be detected.

5. In a system for demodulating frequency modulated carrier waves, apparatus comprising the combination of a limiter amplifier for frequency modulated carrier waves, said limiter amplifier including an electron discharge device having a cathode, a control grid, a screen grid and an anode, an input circuit coupled between said control grid and cathode to which said frequency modulated carrier waves are applied, an output circuit coupled between said anode and cathode, frequency modulation detecting means coupled to said output circuit, said detecting means including a second electron discharge device operating as a quadrature grid detector for detecting directly modulated carrier waves of relatively large amplitude and for detecting locked oscillations when the modulated carrier waves are of relatively small amplitude, means for deriving from said detecting means a control voltage which varies inversely with the amplitude of said frequency modulated carrier waves, and means for applying said control voltage to said screen grid.

6. Apparatus in accordance with claim 5 wherein said second electron discharge device includes a screen electrode which draws a larger current when said modulated carrier waves are of relatively large amplitude than when said modulated carrier waves are of relatively small amplitude, and wherein said control voltage deriving means is responsive to the current drawn by said screen electrode.

7. In a television receiver, an intercarrier sound channel comprising the combination of a source of intercarrier sound intermediate frequency signals, a sound intermediate frequency limiter amplifier coupled to said source, a frequency modulation detector coupled to said sound intermediate frequency limiter amplifier, said frequency modulation detector comprising an electron discharge device operating as an oscillating detector when the output signal level of said sound intermediate frequency limiter amplifier is relatively low and operating as a non-oscillating detector when the output signal level of said sound intermediate frequency limiter amplifier is relatively high, means for deriving a control voltage from said detector which increases when a change in said output signal level causes said detector to change from operation as a non-oscillating detector to operation as an oscillating detector and which decreases when a change in said output signal level causes said electron discharge device to change from operation as an oscillating detector to operation as a non-oscillating detector, and means for automatically controlling the gain of said sound intermediate frequency limiter amplifier in accordance with said control voltage.

8. In a television receiver provided with a source of sound intermediate frequency signals, the combination comprising a sound intermediate frequency limiter amplifier coupled to said source, frequency modulation detecting means coupled to said sound intermediate frequency limiter amplifier, said sound intermediate frequency limiter amplifier comprising an electron discharge device including a screen grid electrode, said detecting means comprising a second electron discharge device operating as a quadrature grid detector for detecting directly modulated carrier waves of relatively large amplitude and for detecting locked oscillations when the modulated carrier waves are of relatively small amplitude, said second electron discharge device also including a screen grid electrode, means including a resistor for connecting said sound detector screen grid electrode to a source of operating potential, and means including said resistor for connecting said sound intermediate frequency limiter amplifier screen grid electrode to said source of operating potential.

9. In a television receiver, the combination comprising an intermediate frequency signal channel common to received sound and picture signals, a video detector coupled to said intermediate frequency channel, means for deriving an intercarrier sound signal from said video detector output, a limiter stage comprising a first electron discharge device coupled to said deriving means, a frequency modulation detector coupled to said limiter stage and responsive to the output thereof, said frequency modulation detector comprising a second electron discharge device operating as a quadrature grid detector for detecting directly intercarrier sound signals when the intercarrier sound signal output of said limiter stage is of relatively large amplitude and for detecting oscillations locked to said intercarrier sound signals when the intercarrier sound signal output of said limiter stage is of relatively small amplitude, said first and second electron discharge devices each including a screen grid, means including a resistor for connecting the screen grid of said second electron discharge device to a source of relatively fixed operating potential, the current drawn by the screen grid of said second electron discharge device through said resistor being appreciably larger when said second electron discharge device responds to intercarrier sound signals of relatively large amplitude than when said second electron discharge device responds to intercarrier sound signals of relatively small amplitude, and means including said resistor for connecting the screen grid of said first electron discharge device to said source of operating potential.

10. In a system for demodulating frequency modulated carrier waves, apparatus comprising the combination of an amplifier for said frequency modulated carrier waves, said amplifier including an electron discharge device having a cathode, a control grid and an anode, an input circuit coupled between said control grid and cathode to which said frequency modulated carrier waves are applied, an output circuit coupled between said anode and cathode, frequency modulation detecting means coupled to said output circuit and operating as an oscillating detector with respect to frequency modulated carrier waves appearing in said output circuit at amplitude levels in a first predetermined range, said detecting means operating as a non-oscillating detector with respect to frequency modulated carrier waves appearing in said output circuit at amplitude levels in a second predetermined range higher than said first predetermined range, means for deriving from said detecting means a control voltage which is of a greater magnitude when said detecting means operates as an oscillating detector than when said detecting means operates as a non-oscillating detector, and means coupled to said amplifier for controlling the gain of said amplifier in accordance with the control voltage derived by said deriving means.

References Cited in the file of this patent

UNITED STATES PATENTS

| | | |
|---|---|---|
| 1,949,507 | Wise | Mar. 6, 1934 |
| 1,971,741 | Willging | Aug. 28, 1934 |
| 2,343,263 | Okrent | Mar. 7, 1944 |
| 2,368,052 | Unger | Jan. 23, 1945 |
| 2,494,795 | Bradley | Jan. 17, 1950 |
| 2,874,277 | Orr | Feb. 17, 1959 |

FOREIGN PATENTS

| | | |
|---|---|---|
| 639,922 | Great Britain | July 12, 1950 |